United States Patent [19]

Heck et al.

[11] Patent Number: 4,719,432
[45] Date of Patent: Jan. 12, 1988

[54] OSCILLATOR FOR MEASURING TEMPERATURE

[75] Inventors: Bernd Heck; Dierk Schröder, both of Hamburg, Fed. Rep. of Germany

[73] Assignee: U.S. Philips Corporation, New York, N.Y.

[21] Appl. No.: 892,604

[22] Filed: Aug. 4, 1986

[30] Foreign Application Priority Data

Aug. 16, 1985 [DE] Fed. Rep. of Germany ....... 3529245

[51] Int. Cl.4 ............................................. G01K 7/16
[52] U.S. Cl. ....................................... 331/66; 340/595; 374/185
[58] Field of Search ................... 331/66, 65; 374/183, 374/185, 172, 173; 340/595

[56] References Cited

U.S. PATENT DOCUMENTS 3,906,391 9/1975 Murdock .............................. 331/66
4,090,151 5/1978 Presset et al. ....................... 331/66

Primary Examiner—Siegfried H. Grimm
Attorney, Agent, or Firm—Robert T. Mayer; Bernard Franzblau

[57] ABSTRACT

A measuring oscillator for measuring temperature has an all-pass filter (1) which drives a current source (16) having a controllable amplification factor and a control element (17). The control element is connected to the control input of the current source (16) and controls its amplification factor in a manner such that the amplitude of the alternating voltage produced by the measuring oscillator assumes a constant value. The all-pass filter comprises a phase-determining bipolar circuit arrangement (10) comprising a voltage follower (12), whose input is connected to one terminal (9) of the circuit arrangement (10) and whose output is connected through an ohmic input resistor (13) to the inverting input of a first operational amplifier (14), which is fed back negatively through a measuring resistor (15) having a temperature-dependent ohmic resistance value. The output of the first op-amp also is connected through an ohmic resistor (41) to the one terminal (9) of the bipolar circuit arrangement. The non-inverting input of the first op-amp is connected to the other terminal (11) of the bipolar circuit arrangement. Small temperature variations sensed by the measuring resistor lead to comparatively large adequately measurable variations of the frequency of the measuring oscillator.

12 Claims, 2 Drawing Figures

OSCILLATOR FOR MEASURING TEMPERATURE

BACKGROUND OF THE INVENTION

This invention relates to a measuring oscillator for temperature sensing, which produces a signal having a temperature-dependent frequency, and comprises an amplifier fed back positively through an all-pass filter, the all-pass filter comprising a bipolar phase-determining circuit element having a temperature-dependent ohmic resistance value which varies the frequency to be measured of the oscillator signal in dependence upon temperature.

The magazine etz-b, Vol. 25 of 1973, No. 9, p. 220-222 discloses a measuring oscillator of the kind described in the opening paragraph having an all-pass filter which comprises, as a phase-determining ohmic resistive element, a platinum resistance thermometer. At temperatures between 0° C. and 100° C., oscillator frequencies between 800 Hz and 1 kHz are obtained. As a result of this comparatively small frequency variation of 20% for a temperature variation of 100° C. small temperature variations can be measured with insufficient accuracy. The small frequency variations then obtained require a frequency measuring appartus of high resolution.

SUMMARY OF THE INVENTION

An object of the invention is to increase the sensitivity of the measuring oscillator to such an extent that even small temperature variations lead to comparatively large, adequately measurable variations of the oscillator frequency.

This object is achieved in a measuring oscillator of the kind mentioned in the opening paragraph in that the bipolar circuit element is constructed as a bipolar circuit arrangement which is connected to a measuring resistor having a temperature-dependent ohmic resistance value, and wherein the ohmic resistance of the bipolar circuit arrangement, which can be sensed by the all-pass filter, varies more strongly with temperature than the resistance of the measuring resistor.

In an embodiment of the measuring oscillator, the bipolar (i.e. two-pole) circuit arrangement comprises a voltage follower having an input connected to one terminal of the circuit arrangement and an outputconnected through an ohmic input resistor to the inverting input of a first operational amplifier. This operational amplifier is negatively fed back through the measuring resistor and its output is connected through an ohmic resistor to one terminal, and its non-inverting input is connected to the other terminal of the bipolar circuit arrangement. A temperature-dependent variation of the resistance value of the measuring resistor connected in the negative feedback circuit of the operational amplifier then produces a large variation of the ohmic resistance value of the bipolar circuit arrangement and hence a comparatively large variation of the oscillator frequency of the harmonic measuring oscillator.

A simply constructed first order all-pass filter that can be manufactured at low cost is obtained if the input and the output of the all-pass filter are interconnected through an ohmic voltage divider, whose centre tapping is connected to the inverting input of a second operational amplifier, which is connected on the output side to the output of the all-pass filter and whose non-inverting input is connected on the one hand through a capacitor to the input of the all-pass filter and on the other hand to one terminal of the bipolar circuit arrangement, whose other terminal is connected to ground.

In an advantageous embodiment of the measuring oscillator, the output of the voltage follower is connected to the input of a non-inverting amplifier, which is connected on the output side to one terminal of the bipolar circuit arrangement. Thus, the first operational amplifier fed back negatively through a temperature-dependent resistor has connected parallel to it a non-inverting amplifier, which increases the ohmic resistance of the bipolar circuit arrangement so that as a result the oscillator frequency of the measuring oscillator can be reduced through the amplification factor of the non-inverting amplifier by a constant amount.

In an embodiment of the invention, the bipolar circuit arrangement has a change-over switch which, in one position, connects the terminal remote from the first operational amplifier of the ohmic input resistor to the output of the voltage follower, and in the other position of the change-over switch to an output of the non-inverting amplifier. By actuation of the change-over switch, the non-inverting amplifier can be connected in series with the first operational amplifier which is fed back negatively through the temperature-dependent resistor. Thus, the input voltage of the first operational amplifier is increased so that its amplification factor and hence also its phase errors can be reduced.

BRIEF DESCRIPTION OF THE DRAWING

In order that the invention may be readily carried out, it will now be described more fully, by way of example, with reference to the accompanying drawings, in which.

DESCRIPTION OF THE PREFERRED EMBODIMENTS

Figure 1:
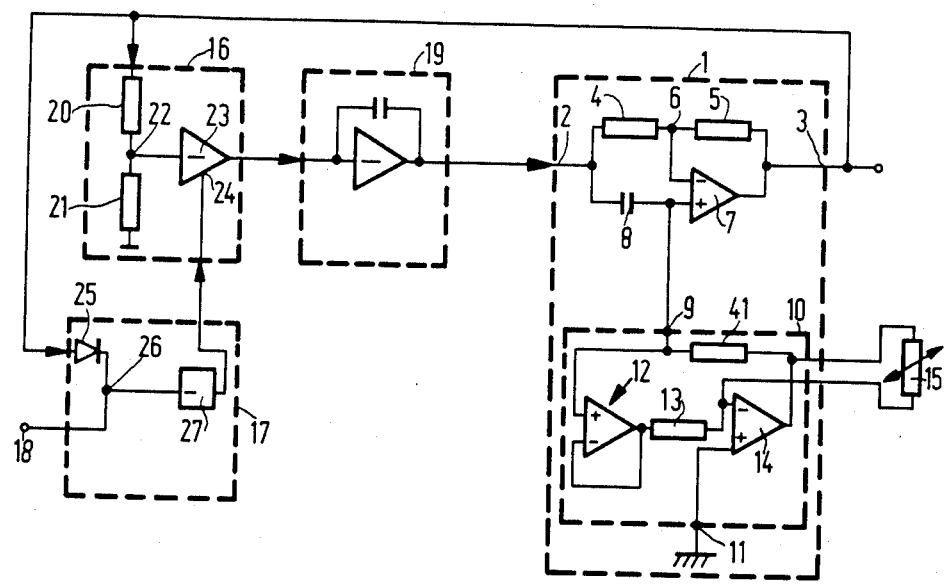
FIG. 1 shows a circuit diagram of the measuring oscillator.

The measuring oscillator shown in FIG. 1 comprises a first order all-pass filter 1 having an input 2 and an output 3 interconnected through an ohmic voltage divider 4, 5. The centre tapping 6 of the ohmic voltage divider 4, 5 is connected to the inverting input of a second operational amplifier 7, which is connected at the output side to the output 3 of the all-pass filter 1. The non-inverting input of the second operational amplifier 7 is connected through a capacitor 8 to the input 2 of the all-pass filter 1 and, moreover, to one terminal 9 of a bipolar circuit element, whose other terminal 11 is grounded. The circuit element comprises a bipolar circuit arrangement 10 (e.g. a temperature dependent two pole active network) which is connected to a measuring resistor 15.

The circuit arrangement 10 comprises a voltage follower 12, which may be construced for example as an operational amplifier, whose inverting input and whose output are interconnected and whose non-inverting input is connected to one terminal 9 of the bipolar circuit arrangement 10. The output 10 of the voltage follower 12 is connected through an ohmic input resistor 13 to the inverting input of a first operational amplifier 14, which is fed back negatively through the measuring resistor 15 having a temperature-dependent resistance value. The measuring resistor 15 may be for example, a Pt 100 resistance thermometer. The operational amplifier 14, however, may also be fed back negatively through a measuring resistor 15 whose ohmic resistance value depends upon another physical measuring quantity, for example upon a magnetic field. The output of the operational amplifier 14 is connected through an ohmic resistor 41 to the terminal 9 and the non-inverting input of the operational amplifier 14 is connected through the other terminal 11 of the bipolar circuit arrangement 10 to ground.

The output 3 of the all-pass filter 1 is connected on the one hand to a current source 16 and on the other hand to a control element 17, which has an input terminal 18 for supplying an amplitude setpoint and is connected on the output side to the control input of the current source 16 for controlling the current supplied by the current source.

The current source 16 is connected through a 90° phase shift element 19 to the input 2 of the all-pass filter 1. The 90 phase shift element 19 is constructed, for example, as an inverting operational amplifier capacitively fed back negatively. The current source 16 may consist, for example, of an ohmic voltage divider 20, 21 which is connected to the output 3 of the all-pass filter 1 and whose centre tapping 22 is connected to the inverting input of a third operational amplifier 23 with a current output, which has a control input 24 for adjusting the amplification factor and hence the value of the supplied current.

The control element 17 comprises a rectifier 25, connected to the output 3 of the all-pass filter 1. The rectifier is connected, together with an input terminal 18 for supplying the amplitude setpoint, to a summation point 26. The summation point 26 is connected to the inverting input of a smoothing device 27, which determines the negative linear average value of the alternating voltage supplied through the summation point 26 and supplies it through the control input 24 to the third operational amplifier 23. The smoothing device 27 may be constructed, for example, as an integration element with an inverting input.

The measuring oscillator essentially consists of an amplifier 16, which is fed back positively through an all-pass filter 1 and consequently oscillates at a frequency dependent upon the impedance values of the phase-determining capacitor 8 and of the phase-determining circuit element 10, 15. The amplitude of the alternating voltage produced by the measuring oscillator is controlled by the control element 17 in a manner such that it assumes a constant value. For this purpose, the alternating voltage supplied by the all-pass filter 1 is rectified in the rectifier 25. The direct voltage of negative polarity supplied through the input terminal 18 and corresponding to the amplitude setpoint is added to the direct ripple voltage produced by the rectifier 25 at the summation point 26. The smoothing device 27 with an inverting input produces from the resulting alternating voltage a negative or positive direct voltage, which is supplied to the control input 24 of the third operational amplifier 23 and which reduces or enlarges its amplification factor if the amplitude of the alternating voltage supplied by the all-pass filter 1 is larger or smaller than the given amplitude setpoint.

The first operational amplifier 14 included in the bipolar circuit arrangement 10 produces from the alternating voltage applied to the non-inverting input of the second operational amplifier 7 and hence on the one hand to one terminal of the resistor 41 and on the other hand through the voltage follower 12 also to the inverting input of the first operational amplifier 14 an alternating voltage which is in phase opposition thereto and is applied to the other terminal of the resistor 41. The current flowing through the resistor 41 and hence the overall current flowing into the circuit arrangement 10 depends upon the difference of the voltages of different polarities applied to the two terminals of the resistor 41. The larger the temperature to be recorded and hence the resistance value of the resistive element 15, the amplification factor of the first operational amplifier 14 and the alternating voltage produced by the first operational amplifier 14 and applied to the resistor 41, the larger is the current flowing into the circuit arrangement 10.

However, an increase of this current has the same meaning as a decrease of the ohmic resistance of the circuit arrangement 10. The frequency of the alternating voltage produced by the measuring oscillator is inversely proportional to the ohmic resistance of the circuit element 10, 15 and hence is proportional to the temperature recorded by the measuring resistor 15. Furthermore, the frequency of the alternating voltage may also depend upon another physical quantity if the impedance values of the capacitor 8 or of the measuring resistor 15 vary with this physical quantity.

Figure 2:
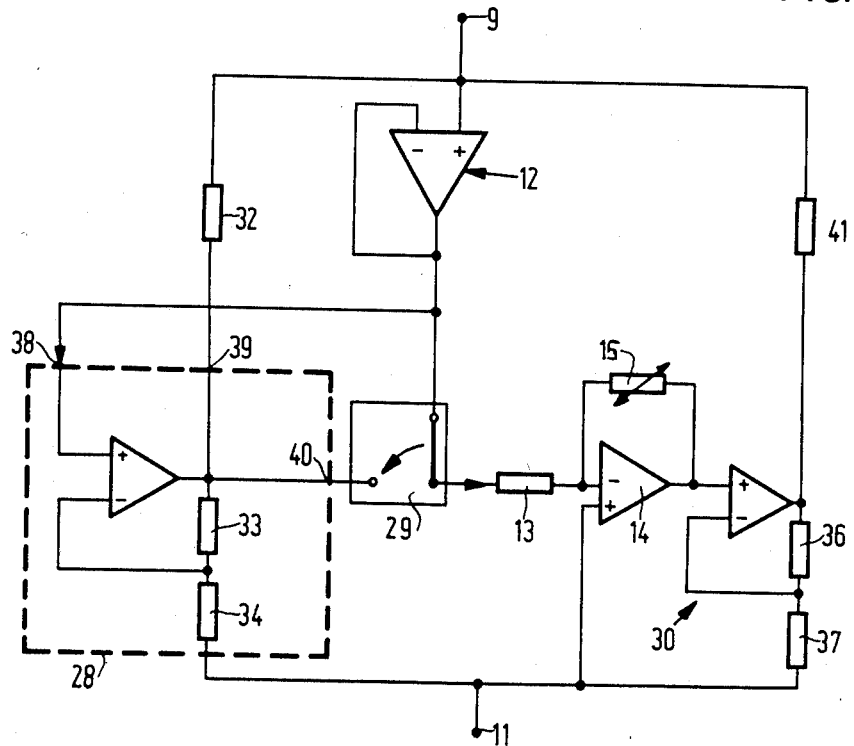
FIG. 2 shows a circuit diagram of an embodiment of the bipolar circuit element.

The embodiment of the bipolar circuit element 10, 15 shown in FIG. 2 comprises, besides the voltage follower 12, the first operational amplifier 14 with the ohmic input resistor 13 and the measuring resistor 15 having a temperature-dependent ohmic resistance value in the negative feedback circuit and the resistor 41, a non-inverting amplifier 28, whose input 38 is connected to the output of the voltage follower 12 and whose output 39 is connected through a resistor 32 to the input of the voltage follower 12. Furthermore, the circuit element shown in FIG. 2 comprises a change-over switch 29, which connects the connection terminal remote from the operational amplifier 14 of the ohmic input resistor 13 in one position shown in FIG. 2 to the output of the voltage follower 12 and in the other position indicated by an arrow to a further output 40 of the non-inverting amplifier 28. Moreover, a further non-inverting amplifier 30 is connected between the first operational amplifier and the resistor 41.

Since the non-inverting amplifier 28 acts as a voltage follower, the voltage follower 12 may be dispensed with if the output 40 of the amplifier 28 remains electrically connected to the input resistor 13.

The amplifier 28 amplifies the alternating voltage supplied by the voltage follower 12 and applied to the input 38 in the same phase and supplies it through the output 39 to one connection of the resistor 32, to whose other connection the alternating voltage supplied through the terminal 9 is applied. The current flowing through the resistor 32 depends upon the difference of the alternating voltages applied to the two connections and is in phase opposition to the current flowing through the resistor 41. Thus, the overall current flowing into the bipolar circuit element shown in FIG. 2 is reduced. This has the same meaning as an increse of the ohmic resistance of the bipolar circuit element, as a result of which the oscillator frequency of the measuring oscillator is reduced by a constant amount. The amplification factors of the non-inverting amplifiers 28 and 30 can be adjusted through a corresponding proportioning of the resistors 33, 34, 36 and 37 and the currents can be adjusted by a variation of the resistors 32 and 41 so that the ohmic resistance of the bipolar circuit element of FIG. 2, and hence also the frequency of the alternating voltage produced by the measuring oscillator, can thus be adjusted.

If, by means of the change-over switch 29, the ohmic input resistor 13 is separated from the output of the voltage follower 12 and is connected to the output 40 of the non-inverting amplifier 28, the first operational amplifier 14 is no longer fed by the voltage follower 12, but by the non-inverting amplifier 28 so that measuring errors due to phase shifts are thus avoided. By means of the change-over switch 29, the frequency produced by the measuring oscillator can moreover be changed over because the voltage supplied by the voltage follower 12 in dependence upon the position of the switch 29 is amplified either by two or by three amplifiers so that the voltage applied to the resistor 41, the current flowing through the resistor 41, the ohmic resistance of the whole circuit element shown in FIG. 2 and hence the frequency of the measuring oscillator can thus be changed over.

What is claimed is:

1. A measuring oscillator for measuring temperature and which produces a signal having a temperature-dependent frequency, said measuring oscillator comprising: an amplifier fed back positively through an all-pass filter, the all-pass filter comprising a bipolar phase-determining circuit arrangement providing a temperature-dependent ohmic resistance which varies the frequency of the oscillator signal in dependence upon temperature, characterized in that the bipolar circuit arrangement is connected to a measuring resistor having a temperature-dependent ohmic resistance value such that the ohmic resistance of the bipolar circuit arrangement varies more strongly with the temperature than does the resistance of the measuring resistor.

2. A measuring oscillator as claimed in claim 1, characterized in that the bipolar circuit arrangement comprises a voltage follower having an input connected to a first terminal of the bipolar circuit arrangement, an output of the voltage follower being connected through an ohmic input resistor to an inverting input of a first operational amplifier which is fed back negatively via the measuring resistor, an output of the first operational amplifier being connected through an ohmic resistor to said first terminal, and means connecting a non-inverting input of the first operational amplifier to a second terminal of the bipolar circuit arrangement.

3. A measuring oscillator as claimed in claim 2, characterized in that an input and an output of the all-pass filter are inter-connected through an ohmic voltage divider having a centre tapping connected to an inverting input of a second operational amplifier, means connecting an output of the second operational amplifier to the output of the all-pass filter and its non-inverting input through a capacitor to the input of the all-pass filter and to said first terminal of the bipolar circuit arrangement, and means connecting the second terminal of the bipolar circuit arrangement to ground.

4. A measuring oscillator as claimed in claim 3, characterized in that the output of the voltage follower is connected to an input of a non-inverting amplifier having an output connected through a resistor to said first terminal of the bipolar circuit arrangement.

5. A measuring oscillator as claimed in claim 4, characterized in that the bipolar circuit arrangement inclues a change-over switch having one position which connects the terminal of the ohmic input resistor that is remote from the first operational amplifier to the output of the voltage follower, said change-over switch having a second position which connects said remote terminal of the ohmic input resistor to an output of the non-inverting amplifier.

6. An oscillator for measuring temperature by means of a variation in the frequency of an oscillation output signal as a function of the temperature to be measured, said oscillator comprising: an amplifier having an input and an output, an all-pass filter having an input coupled to said amplifier output and an output coupled to said amplifier input so as to provide positive feedback for the amplifier, said all-pass filter including a temperature dependent two-pole active circuit comprising a temperature-dependent measuring resistor that provides a given resistance variation for a given temperature variation, said two-pole active circuit including means for producing a temperature-dependent resistance variation which varies the oscillator frequency as a function of the temperature to be measured, whereby for said given temperature variation said temperature-dependent resistance variation of the two-pole active circuit is substantially greater than said given resistance variation of the measuring resistor.

7. An oscillator as claimed in claim 6 further comprising a control element having an input coupled to an output of the all-pass filter and an output coupled to a gain control input of said amplifier and operative to control the gain of said amplifier as a function of an output oscillation signal of the all-pass filter and in a sense to maintain a constant amplitude oscillation signal at an output of the oscillator.

8. An oscillator as claimed in claim 7 wherein said control element further comprises a second input for a setpoint DC voltage, and means for combining the setpoint voltage with a signal voltage derived from said oscillation signal supplied to the first input of the control element.

9. An oscillator as claimed in claim 6 wherein said two-pole active circuit comprises, a first termnal coupled to an input of a voltage-follower, an input resistor connecting an output of the voltage-follower to an inverting input of a first op-amp, said measuring resistor being connected in a negative feedback circuit coupling an output of the op-amp to said inverting input thereof, an ohmic resistor connecting said op-amp output to said first terminal, and means connecting a non-inverting input terminal of the op-amp to a second terminal of the two-pole active circuit.

10. An oscillator as claimed in claim 9 wherein the all-pass filter further comprises, a voltage divider connected between the input and output of the all-pass filter, a second op-amp having a non-inverting input coupled to said first terminal of the two-pole active circuit and via a capacitor to said input of the all-pass filter, an inverting input connected to a tap point on the voltage divider and an output coupled to the output of the all-pass filter, and means coupling the second terminal of the two-pole active circuit to a point of reference potential.

11. An oscillator as claimed in claim 9 wherein said two-pole active circuit further comprises a non-inverting amplifier having an input coupled to the output of the voltage-follower and an output coupled via a resistor to said first terminal of the two-pole active circuit.

12. An oscillator as claimed in claim 6 wherein said amplifier is part of a current source circuit.

* * * * *